D. S. HOWELL.
HAY RACK LOCK.
APPLICATION FILED MAR. 25, 1914.
1,132,848.
Patented Mar. 23, 1915.
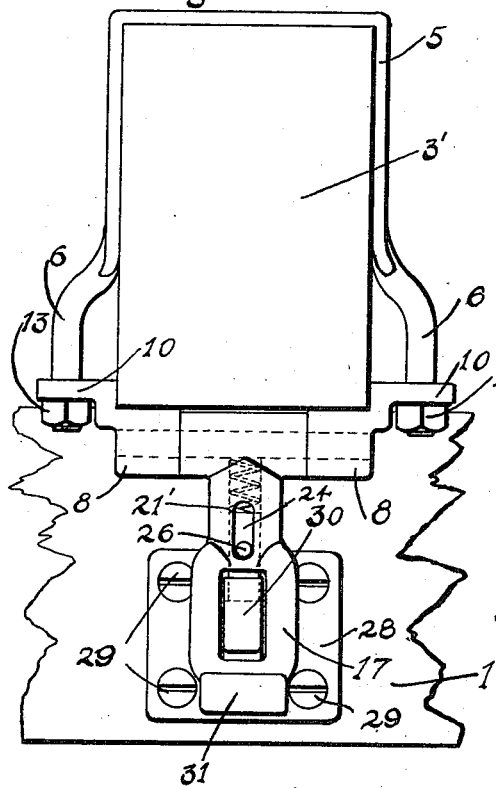
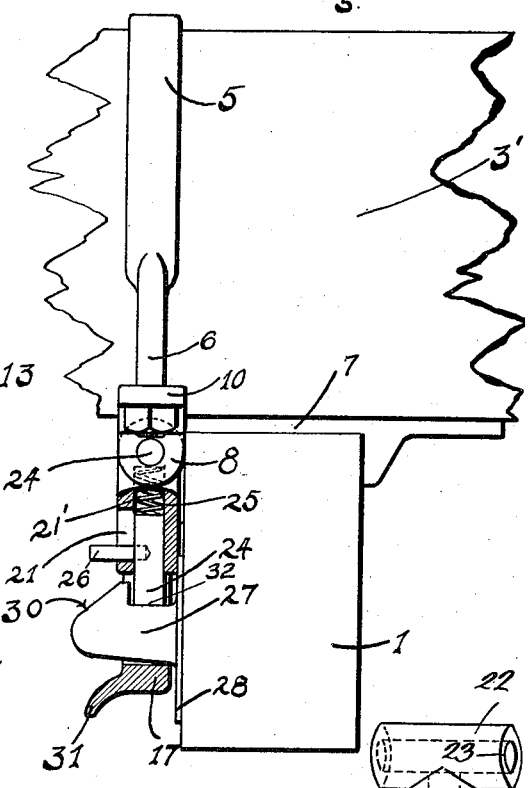
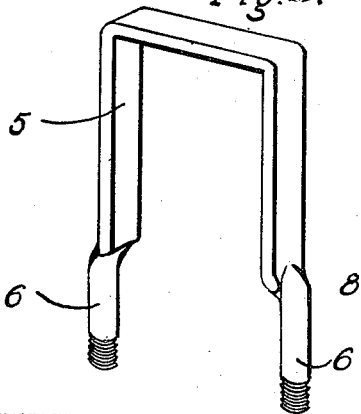
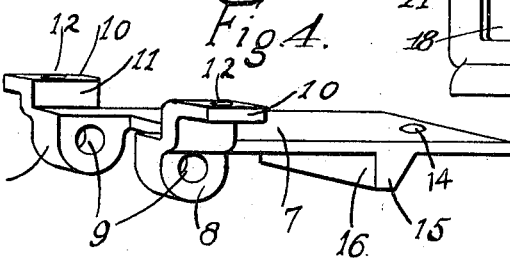
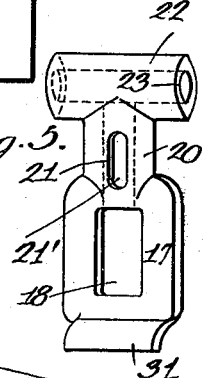
WITNESSES:
Wade Koontz
H. B. Vrooman
INVENTOR.
David S. Howell.
BY
E. E. Vrooman,
his ATTORNEY.
THE NORRIS PETERS CO., PHOTO-LITHO., WASHINGTON.

UNITED STATES PATENT OFFICE.

DAVID S. HOWELL, OF OCONTO, WISCONSIN.

HAY-RACK LOCK.

1,132,848.  Specification of Letters Patent.  Patented Mar. 23, 1915.

Application filed March 25, 1914. Serial No. 827,182.

*To all whom it may concern:*

Be it known that I, DAVID S. HOWELL, a citizen of the United States, residing at Oconto, R. D. No. 1, in the county of Oconto and State of Wisconsin, have invented certain new and useful Improvements in Hay-Rack Locks, of which the following is a specification, reference being had therein to the accompanying drawing.

This invention relates to a hay rack lock and the principal object of the same is the production of a lock for detachably retaining a hay rack or similar article upon the body of the wagon for preventing the accidental removal therefrom, when in use.

Another object of this invention is the production of a lock which is adapted to be supported upon the hay rack in such a manner as to allow the hay rack to be efficiently locked upon the upper portion of a wagon body, this lock being capable of releasement when it is desired to remove the hay rack from the wagon body.

With these and other objects in view this invention consists of certain novel combinations, constructions, and arrangements of parts as will be hereinafter fully described and claimed.

In the accompanying drawings:—Figure 1 is a fragmentary side elevation of a portion of a wagon body and hay rack showing the locking device in operation. Fig. 2 is a fragmentary elevation of a portion of a hay rack and wagon body showing the locking member in a locked position, portions of this member being shown in section. Fig. 3 is a detailed perspective view of the clasp forming a part of this locking member. Fig. 4 is a detailed perspective view of a certain plate upon which the clasp is pivotally supported. Fig. 5 is a detailed perspective view of the retaining clamp.

Referring to the accompanying drawings by numerals 1 designates an ordinary wagon body upon which the usual hay rack is adapted to be supported. The hay rack 3' is adapted to be positioned upon the wagon body 1 so as to allow the locking members to engage the keepers carried by the wagon body 1 whereby the rack will be efficiently supported upon the wagon body without danger of the same falling or being jarred from position.

For the purpose of supporting the locks upon the hay rack there are provided U-shaped clamps 5 which terminate at their lower ends in threaded bolt portions 6. These clamps 5 are positioned upon the rack 3' so as to allow the clamps to extend over the sides of the wagon body 1. Upon each clamp 5 there is positioned a plate which comprises a body portion 7 which is provided with the downwardly extending lugs 8 having the openings 9 formed therein. The laterally extending ears 10 are formed upon the upper outer sides of the lugs so as to form the shoulders 11. This body 7 is elongated so as to fit upon the lower portions of the rack 3' whereby the ears 10 will embrace the rack so as to allow the shoulders 11 to prevent the lateral movement of the plate upon the rack. These ears 10 are provided with apertures 12 through which the threaded bolt ends 6 of the clamp 5 are adapted to pass so as to allow the threaded ends 6 to extend for a distance below the ears 10 for allowing the nuts 13 to be threaded thereon, whereby the plate will be held securely upon the rack without danger of the same becoming accidentally loose. The plate 7 is also provided at its rear end with an aperture 14 for the reception of any suitable securing means which is adapted to pass into or engage the rack 3' upon which the plate is supported for efficiently holding the rear portion of the plate in position. This plate is also provided with an integral transverse rib 15 as disclosed in Figs. 2 and 4, this rib being provided with a vertical inner face 16 which is adapted to engage the inner portion of one of the side rails of the wagon body 1, while the lugs 8 will engage the outer face of the side rails of the wagon body 1, thereby holding the plate against transverse movement upon the wagon body 1, and in this manner relieve the locking portion of the device from any strain caused by lateral movement. It will, of course, be observed that the lower threaded bolt ends 6 of each clamp 5 are offset relative to the body of the clamp as clearly disclosed in Fig. 1 for allowing the lower ends of the clamp to pass through the apertures 12 formed in the ears 10 without having binding action, owing to the fact that the ears 10 are formed at a distance from the side edges of the plate 17.

The clasps which are adapted to detachably retain the rack upon the wagon body are all formed similar, each one comprising a body 17 having a vertical slot 18 formed therein. A neck 20 is formed integral upon the upper portion of the body 17 of each clasp and is provided with a central bore 21' having the secondary slot 21 communicating therewith. The bearing sleeve 22 having a central bore 23 is positioned between the lugs 8 so as to allow the pivot pin 24 to pass through the openings 9 formed in the lugs 8 and through the bore 23 formed in the bearing sleeve 22 whereby the clasp will be held in pivotal engagement with the plate. The plunger 24 is positioned within the central bore 21' of the neck 20 so as to freely reciprocate therein and upon the inner end of the plunger 24 the coiled spring 25 is adapted to bear, as disclosed in Fig. 2. This coiled spring 25 is also positioned within the bore 21' so as to bear at its inner end upon the inner end portion of the neck 20 formed adjacent the bore 21'. For the purpose of allowing the plunger 24 to be moved into the interior of the bore 21' there is provided a pin 26 which extends through the slot 21 so as to engage the plunger 24 thereby allowing the plunger to be moved into the interior of the neck by compressing the spring when it is so desired. When this plunger 24 is in an extended position the outer end thereof will extend into the slot 18 as clearly disclosed in Fig. 2. The outward movement, however, of this plunger is limited by the pin 26 since the pin will engage the neck 20 adjacent the outer end of the slot 21. A keeper 27 is formed integral on the plate 28, this plate being secured to the side of the wagon body 21 by means of the securing screws or bolts 29. This keeper is provided at its outer end with a beveled face 30 which extends toward its upper portion and upon which the plunger 24 is adapted to ride when the clasp is being moved to a locked position. The lower end of the body 17 of the clasp is provided with an outwardly extending lip 31 for allowing the clasp to be easily gripped when it is desired to remove the same from engagement with the keeper 27. When this device is in use the rack is first placed upon the upper portion of the wagon body. By swinging the clasp toward the keeper 27 the outer end of the keeper will pass through the slot 18 formed therein at which time the plunger 24 will ride upon the inclined face 30 thereby compressing the spring 25 within the bore 21'. As soon as the plunger has passed over the inclined face 30 it will then be sprung outwardly so as to engage the inner pocket portion 32 of the keeper 27, thereby locking the clasp in engagement with the keeper. The clamp 5 engages the rack and supports the plate 7 upon the lower portion of the rack. The plate will hold the rack against lateral movement upon the wagon body since the lugs 8 and rib 15 formed at spaced distances from each other will fit upon the side portions of the side boards of the wagon body as shown in Fig. 2. Since the keeper 27 passes through the slot 18 formed in the clasp any danger of the rack being jarred or accidentally removed from the upper portion of the wagon body will be eliminated since the plunger will retain the clasp in engagement with the keeper. When, however, it is desired to remove the rack from the upper portion of the wagon body 1 the pin 26 may be moved toward the inner end of the slot 21 formed in the neck 20 thereby causing the plunger 24 to compress the spring 25 and thus remove the plunger 24 from the pocket 32 of the keeper 27. At this time the lip 31 may be gripped and the clasp swung upwardly thus unlocking the device and allowing the rack to be removed from the wagon body after all of the locking members have thus been freed from engagement with each keeper 27.

From the foregoing description it will be seen that a simple and efficient device has been produced for efficiently retaining the rack upon a body, this means being efficiently supported upon the rack and being adapted to be easily operated for retaining or for releasing the rack from engagement with the wagon body.

What is claimed as new, is:—

1. In a device of the class described the combination with a U-shaped clamp, a plate carried by the free ends of said clamp, said plate comprising an elongated body, integral depending lugs formed upon the forward end of said body at a spaced distance from each other, each lug provided with a bearing opening, an integral rib formed upon the under face of said plate at a spaced distance from said lugs, said lugs and rib adapted to fit upon the opposite side of a side rail of a wagon body whereby a rack upon which the plate is carried will be held against lateral movement, and latching means pivotally secured to said lugs for detachably retaining a rack upon a wagon body.

2. In a device of the class described the combination with a U-shaped clamp, said clamp terminating at its lower end in off-set threaded bolt portions, a plate, said plate comprising an elongated body, integral spaced lugs upon the outer end of said body, said lugs formed in a spaced relation to each other, outwardly extending ears formed upon the upper outer portions of said lugs thereby constituting shoulder portions between said ears, said plate adapted to be positioned upon a rack whereby said ears may be positioned upon each side of a portion of a rack for holding the plate against lateral movement, means formed upon said plate for holding a rack against lateral movement, said off-set threaded bolt ends of said clamp passing through said ears for firmly holding said plate upon a rack, and means pivotally secured to said lugs for detachably retaining a rack upon a wagon body.

3. In a device of the class described the combination with a clamp adapted to be supported upon a hay rack, a plate secured to the free ends of said clamp, means formed upon said plate for holding a rack against lateral movement, means formed upon said plate for holding said plate upon a rack against lateral movement, lugs integral with said plate and formed at a spaced distance from each other a clasp pivotally secured to said lugs, said clasp comprising a body having a vertical slot, said clasp also provided with an integral neck formed upon said body, said neck having a central bore, and means carried within said bore and adapted to engage a keeper carried by a wagon body for detachably holding said clasp in engagement with a keeper whereby a rack would be detachably retained upon a wagon body.

4. In a device of the class described the combination with a plate, means for supporting said plate upon a hay rack, means for holding said plate upon a rack against lateral movement, said plate adapted to hold a rack against lateral movement upon a wagon body, said plate provided with spaced lugs, said lugs provided with bearing openings, a clasp having a bearing sleeve positioned between said lugs, a pivot pin passing through said lugs and said sleeve for pivotally securing said clasp to said plate, an integral neck formed upon said sleeve and terminating at its lower portion in an enlarged body, said body provided with a vertical slot whereby said body may pass over a keeper, said neck provided with a central bore, a plunger positioned within said bore, a spring positioned within said bore and adapted to urge said plunger upwardly, said plunger adapted to engage a keeper whereby said clasp may detachably engage a keeper thereby allowing a rack to be detachably supported upon a wagon body.

In testimony whereof I hereunto affix my signature in presence of two witnesses.

DAVID S. HOWELL.

Witnesses:
O. B. PARISEY,
E. BALDWIN.

Copies of this patent may be obtained for five cents each, by addressing the "Commissioner of Patents, Washington, D. C."